United States Patent [19]

Dazzi

[11] 3,919,221
[45] Nov. 11, 1975

[54] PROCESS FOR THE MANUFACTURE OF S-TRIAZINYL-MONOISOCYANATES OR S-TRIAZINYL-DIISOCYANATES

[75] Inventor: Joachim Dazzi, Riehen, Switzerland

[73] Assignee: Ciba-Geigy Corporation, Ardsley, N.Y.

[22] Filed: Feb. 15, 1974

[21] Appl. No.: 443,060

[30] Foreign Application Priority Data
Mar. 1, 1973 Switzerland.................. 3003/73

[52] U.S. Cl. ...... 260/249.5; 260/249.8; 260/249.9; 260/249.6
[51] Int. Cl.² ............ C07D 251/16; C07D 251/18; C07D 251/44
[58] Field of Search.......... 260/249.8, 249.6, 249.5, 260/249.9

[56] References Cited
UNITED STATES PATENTS
2,340,757   2/1944   Kaase et al................ 260/249.5 X
3,538,121   11/1970  Gazzard et al.............. 260/248
3,732,223   5/1973   von Gizycki et al......... 260/249.8

FOREIGN PATENTS OR APPLICATIONS
1,308,688   2/1973   United Kingdom

OTHER PUBLICATIONS
Speziale et al., J. Org. Chem., Vol. 27, pp. 4361–4364 (1962).
Speziale et al., J. Org. Chem., Vol. 28, pp. 1805–1811 (1963).
Greenhalgh, Chem. Abstracts, Vol. 33, p. 178 (1939).
Hill et al., J. Amer. Chem. Soc., Vol. 62, pp. 1595–1596 (1940).
Speziale et al., J. Org. Chem., Vol. 27, pp. 3742–3743 (1962).
Kirk–othmer, "Encyclopedia of Chemical Technology," Vol. 2, John Wiley (pub.), New York, (1963) pp. 225, 227.

Primary Examiner—John M. Ford
Attorney, Agent, or Firm—Luther A. R. Hall

[57] ABSTRACT

A novel process for preparing s-triazinyl-mono- and -di-isocyanates is disclosed which comprises reacting s-triazinyl-mono- or -diamines with phosgene in certain organic solvents, such as nitrobenzene, and, optionally, in the presence of a catalyst. By said process high yields of s-triazinyl-mono- and -di-isocyanates can be obtained in a simple and economical manner.

7 Claims, No Drawings

PROCESS FOR THE MANUFACTURE OF S-TRIAZINYL-MONOISOCYANATES OR S-TRIAZINYL-DIISOCYANATES

The present invention relates to a new process for the manufacture of s-triazinyl-monoisocyanates or s-triazinyldiisocyanates.

The customary process for the manufacture of isocyanates, that is to say the reaction of amines with phosgene, has hitherto, according to the literature, not led to the desired result in the case of amino-s-triazines (compare Belgian patent specification No. 755,460). s-Triazinyl-monoisocyanates or s-triazinyl-diisocyanates have therefore been manufactured by reaction of corresponding monoamines or diamines with oxalyl chloride at temperatures between 0° and 250°C, using pressure if necessary. However, this process is relatively involved and expensive.

It has now been found that contrary to the teaching of the state of the art, s-triazinyl-monoisocyanates or s-triazinyl-diisocyanates of the formula I

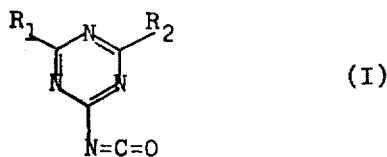

(I)

wherein $R_1$ represents the isocyanate group, a halogen atom, an alkoxy radical or alkylthio radical with 1–6 carbon atoms or a N,N-dialkylamino radical with 1–4 carbon atoms in each of the alkyl radicals and $R_2$ represents a halogen atom, a phenyl radical, an alkyl radical with 1–18 carbon atoms, an alkoxy or alkylthio radical with 1–6 carbon atoms or a N,N-dialkylamino radical with 1–4 carbon atoms in each of the alkyl radicals, can be manufactured simply and economically and with good yields by reacting s-triazinyl-monoamines or s-triazinyl-diamines of the formula II

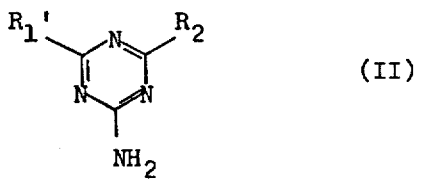

(II)

wherein $R_1'$ represents a $-NH_2$ group, a halogen atom, an alkoxy or alkylthio radical with 1–6 carbon atoms or a N,N-dialkylamino radical with 1–4 carbon atoms in each of the alkyl radicals, and $R_2$ has the meaning indicated under the formula I, with phosgene in a 3-alkoxypropionitrile with 1–4 C atoms in the alkoxy radical, in nitrobenzene, in sulpholane (tetrahydrothiophene-1,1-dioxide) or in o-dichlorobenzene, and if appropriate, in the presence of a catalyst, at a temperature not below 150°C.

If $R_1$ or $R_1'$ and/or $R_2$ denote a halogen atom, this is, for example, fluorine or bromine, but especially chlorine.

As examples of alkyl, alkoxy, alkylthio and N,N-dialkylamino radicals represented by $R_1$ or $R_1'$ and/or $R_2$ there may be mentioned: methyl, ethyl, isopropyl, n-butyl, tert.-butyl, pentyl, hexyl, octyl, decyl, dodecyl, tetradecyl, octa-decyl, methoxy, ethoxy, n-propoxy, n-butoxy, n-hexyloxy, methylthio, ethylthio, isopropylthio, n-butylthio, sec.-butylthio, n-hexylthio, N,N-dimethylamino, N,N-diethylamino, N-methyl-N-ethylamino, N-methyl-N-n-propylamino, N-ethyl-N-n-butylamino and N,N-diisopropylamino radicals.

The s-triazinyl-monoamines or s-triazinyl-diamines of the formula II are known. Preferably, 2-chloro-4,6-diamino-s-triazine and especially 2,4-dichloro-6-amino-s-triazine are used as compounds of the formula II in the process according to the invention.

The s-triazinyl-monoamines or s-triazinyl-diamines are reacted with at least stoichiometric amounts of phosgene, but preferably an approximately 10–50% excess of phosgene over the stoichiometrically required amount is used.

Preferred solvents are nitrobenzene, 3-methoxypropionitrile, 3-ethoxypropionitrile and sulpholane.

The addition of a suitable catalyst, especially when using o-dichlorobenzene as the solvent, can assist the reaction to take place; possible catalysts are, for example, N,N-dimethylforamide, N,N-dimethylacetamide and dimethylsulphoxide. Advantageously, 1 to 20 percent by weight of catalyst, relative to the s-triazinyl-monoamine or s-triazinyl-diamine of the formula II which is employed are used. N,N-Dimethylformamide is preferred as the catalyst.

In accordance with the definition, the reaction is carried out at a temperature of at least 150°C; preferably, however, a temperature between 160° and 200°C is used.

In practice, the reaction is in general carried out by dissolving the s-triazinyl-monamine or s-triazinyl-diamine of the formula II in the solvent at the desired reaction temperature and then passing phosgene into the reaction mixture at the same temperature and distributing the phosgene thoroughly therein. The reaction is in general complete after 3 to 10 hours. The HCl formed during the reaction, and any excess phosgene, are removed quantitatively in the usual manner.

The s-triazinyl-monoisocyanates and s-triazinyl-diisocyanates obtainable according to the invention are in most cases known. They are valuable intermediate products for the manufacture of dyestuffs, brighteners and the like. s-Triazinyl-diisocyanates of the formula I are particularly suitable for the manufacture of polyurethanes according to methods which are in themselves known.

The s-triazinyl-monoisocyanates and s-triazinyl-diisocyanates of the formula I are readily or very readily soluble in the solvents used for the reaction. They can be isolated, for example, by distilling off the solvent, and vacuum distillation of the residue. In many cases, however, isolation is not necessary since the s-triazinyl-monoisocyanates and s-triazinyl-diisocyanates manufactured according to the invention can, without problems, be subjected to further reactions in the reaction solutions. If the isocyanate synthesis is carried out in 3-alkoxypropionitriles, such as 3-methoxypropionitrile or 3-ethoxypropionitrile, which solidify below $-80°C$, the reaction mixture can be cooled to about $-60°C$ and the isocyanate which hereupon precipitates can be separated from the solvent by filtration.

EXAMPLE 1

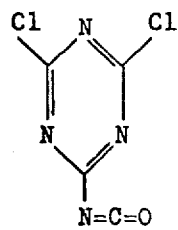

20.6 g (0.125 mol) of 2,4-dichloro-6-amino-s-triazine are dissolved in 246 g (2.0 mols) of nitrobenzene at 175°C. Phosgene is passed in for 9 hours at this temperature. After this time, the reaction is complete. The reaction solution contains 7.5 per cent by weight of 2,4-dichloro-6-isocyanato-s-triazine (theory, 8.7% by weight), corresponding to a yield of 85%; molecular weight 191.

EXAMPLE 2

20.6 g (0.125 mol) of 2,4-dichloro-6-amino-s-triazine are dissolved in 225 g (1.83 mols) of nitrobenzene at 170°C. 0.4 g (0.0055 mol) of N,N-dimethylformamide is then added and excess phosgene is passed in over the course of 3 hours. Excess phosgene and the HCl formed are then removed by means of $N_2$ at 170°C and subsequently at 20°C and 1–2 mm Hg. The reaction solution which remains (237 g) contains 9.1% by weight of 2,4-dichloro-6-isocynato-s-triazine (theory, 9.55% by weight); yield 95%.

EXAMPLE 3

9.5 g (0.057 mol) of 2,4-dichloro-6-amino-s-triazine are dissolved in 140 g (1.14 mols) of nitrobenzene at 170°C. 0.3 g (0.0035 mol) of N,N-dimethylacetamide is then added thereto and phosgene is passed in for 3.5 hours. 145 g of a reaction mixture containing 6.6% by weight of 2,4-dichloro-6-isocyanato-s-triazine (theory, 7.3% by weight) are obtained, corresponding to a yield of 90%.

EXAMPLE 4

6 g (0.036 mol) of 2,4-dichloro-6-amino-s-triazine are dissolved in 100 g (1.27 mols) of 3-methoxypropionitrile at 165°C. Thereafter, excess phosgene is passed in over the course of 9 hours, whilst maintaining the same temperature. The resulting reaction mixture contains 5.9% by weight of 2,4-dichloro-6-isocyanato-s-triazine (theory, 6.5% by weight); yield 90%.

EXAMPLE 5

41.3 g (0.25 mol) of 2,4-dichloro-6-amino-s-triazine are dissolved in 500 g (3.4 mols) of o-dichlorobenzene at 180°C. 1 g (0.014 mol) of N,N-dimethylformamide is then added and excess phosgene is passed in over the course of 8 hours whilst maintaining the same temperature. The resulting reaction mixture contains 6.3% by weight of 2,4-dichloro-6-isocyanato-s-triazine (theory, 8.7% by weight); yield 72%.

EXAMPLE 6

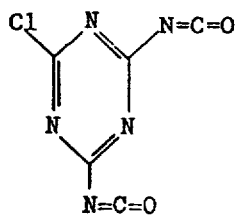

2.91 g (0.02 mol) of 2-chloro-4,6-diamino-s-triazine in 300 g (2.44 mols) of nitrobenzene are heated to 200°C. 0.4 g (0.005 mol) of N,N-dimethylformamide is then added and excess phosgene is passed in over the course of 5 hours at 195°–200°C. The resulting reaction mixture contains 1.0% by weight of 2-chloro-4,6-diisocyanato-s-triazine (theory, 1.3%), corresponding to a yield of 77%; molecular weight 197.5.

EXAMPLE 7

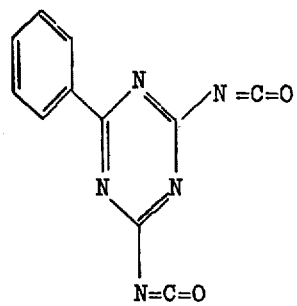

7.5 g (0.04 mol) of 2-phenyl-4,6-diamino-s-triazine (benzoguanamine) are dissolved in 240 g (1.95 mols) of nitrobenzene at 175°C. At this temperature, phosgene is passed in for 9 hours. The resulting reaction mixture contains 2.8% by weight of 2-phenyl-4,6-diisocyanato-s-triazine (theory, 3.8% by weight), corresponding to a yield of 72%; molecular weight 239.

EXAMPLE 8

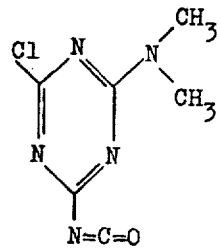

17.3 g (0.1 mol) of 2-chloro-4-N,N-dimethylamino-6-amino-s-triazine are dissolved in 200 g (1.62 mols) of nitrobenzene at 180°C. Excess phosgene is then passed in at this temperature over the course of 9 hours. A reaction mixture containing 6.2% by weight of 2-chloro-4-N,N-dimethylamino-6-isocyanato-s-triazine (theory, 7.4%), is obtained; yield 84%; molecular weight 199.5.

EXAMPLE 9

If Example 8 is repeated, but with the addition of 0.3 g (0.0041 mol) of N,N-dimethylformamide, a mixture which contains 6.6% by weight of 2-chloro-4-N,N-dimethylamino-6-isocyanato-s-triazine (theory, 7.4% by weight) is obtained after a reaction time of 6 hours; yield 89%.

EXAMPLE 10

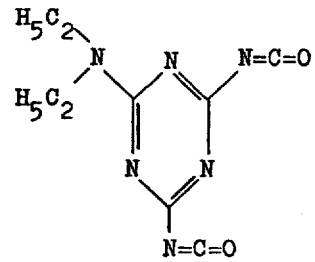

13.7 g (0.075 mol) of 2-N,N-diethylamino-4,6-diamino-s-triazine are dissolved in 130 g (1.05 mols) of nitrobenzene at 175°C. After addition of 0.6 g (0.0082 mol) of N,N-dimethylformamide, excess phosgene is passed in over the course of 3 hours. A reaction mixture which contains 10.25% by weight of 2-N,N-diethylamino-4,6-diisocyanato-s-triazine (theory, 11.84% by weight) is obtained; yield 86.7%; molecular weight 234.

EXAMPLE 11

450 g of the reaction mixture which was obtained according to the process described in Example 4 and consists of 7.4% by weight of 2,4-dichloro-6-isocyanato-s-triazine (0.174 mol; molecular weight 191) and 93.6% by weight of 3-methoxypropionitrile (4.9 mols) are fractionated at 10–12 mm Hg. Hereupon, 3-methoxypropionitrile distils at 47°–48°C/12 mm Hg, and 2,4-dichloro-6-isocyanato-s-triazine distils at 105°–106°C/12 mm Hg (24.9 g; isocyanate content 97.3%, i.e. yield 73.2% of theory).

The isocyanate content of the fraction which distils at 105°–106°C is determined by saponification of 1 mol of 2,4-dichloro-6-isocyanato-s-triazine, which contains neither phosgene nor hydrochloride, with 1 mol of water. This gives 1 mol of 2,4-dichloro-6-amino-s-triazine and 1 mol of $CO_2$ which is quantitatively determined gravimetrically according to standard methods. The analytical method used was developed, and tested, using pure 2,4-dichloro-6-isocyanato-s-triazine, prepared by reaction of 2,4-dichloro-6-amino-s-triazine with oxalyl chloride according to Example 1 of Belgian patent specification No. 755,460.

EXAMPLE 12

12.4 g (0.075 mol) of 2,4-dichloro-6-amino-s-triazine are dissolved in 204 g (1.8 mols) of 3-propoxypropionitrile at 177°C. Excess phosgene is then passed in over the course of 8.5 hours whilst maintaining the same temperature. A reaction mixture which contains 5.6% by weight of 2,4-dichloro-6-isocyanato-s-triazine (theory, 6.6% by weight), is obtained; yield 85%.

EXAMPLE 13

16.5 g (0.1 mol) of 2,4-dichloro-6-amino-s-triazine are dissolved in 198 g (2 mols) of 3-ethoxypropionitrile at 170°C. Excess phosgene is then passed in over the course of 10.5 hours whilst maintaining the same temperature. The resulting reaction mixture contains 7.3% by weight of 2,4-dichloro-6-isocyanato-s-triazine (theory, 8.7% by weight); yield 84%.

EXAMPLE 14

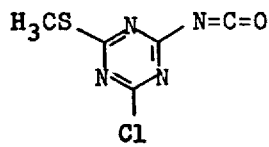

15 g (0.085 mol) of 2-amino-4-chloro-6-methylthio-s-triazine are suspended in 172 g (1.4 mols) of nitrobenzene at 180°C. At this temperature, excess phosgene is passed in over the course of 7 hours. After 15 minutes' reaction time, all the 2-amino-4-chloro-6-methylthio-s-triazine has already dissolved. Excess phosgene, and the HCl, which has formed, are removed by means of $N_2$ at 180°C and subsequently at 20°C/1–2 mm Hg. The solution which remains (183 g) contains 8.5% by weight of 2-isocyanato-4-chloro-6-methylthio-s-triazine (theory, 9.1% by weight), which corresponds to a yield of 94%; molecular weight 202.

EXAMPLE 15

12.4 g (0.07 mol) of 2-amino-4-chloro-6-methylthio-s-triazine are dissolved in 200 g (2.54 mols) of 3-methoxypropionitrile at 165°C. Excess phosgene is then passed in over the course of 8 hours whilst maintaining the same temperature. The resulting reaction mixture contains 5.8% by weight of 2-isocyanato-4-chloro-6-methylthio-s-triazine (theory, 6.5% by weight), which corresponds to a yield of 89%.

EXAMPLE 16

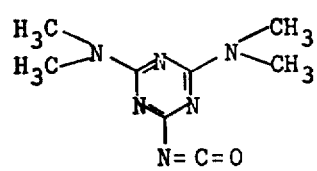

9.1 g (0.05 mol) of 2,4-bis-N,N-dimethylamino-6-amino-s-triazine are dissolved in 172 g (1.4 mols) of nitrobenzene at 150°C. Excess phosgene is then passed in over the course of 9 hours. The resulting reaction mixture (177 g) contains 5.0% by weight of 2,4-bis-N,N-dimethylamino-6-isocyanato-s-triazine (theory, 5.7% by weight); yield 87%; molecular weight 208.

EXAMPLE 17

7.5 g (0.04 mol) of 2-phenyl-4,6-diamino-s-triazine (benzoguanamine) are dissolved in 240 g (2 mols) of sulpholane at 185°C. Phosgene is passed in for 8 hours at this temperature. The resulting reaction mixture contains 2.9% by weight of 2-phenyl-4,6-diisocyanato-s-triazine (theory, 3.8% by weight), corresponding to a yield of 76%; molecular weight 239.

EXAMPLE 18

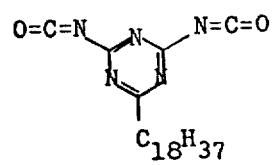

7.2 g (0.02 mol) of 2,4-diamino-6-octadecyl-s-triazine (s-octadecylguanamine) are dissolved in 246 g (2 mols) of nitrobenzene at 180°C. Phosgene is passed in for 7.5 hours at this temperature. The resulting reaction mixture contains 2.4% by weight of 2,4-diisocyanato-6-octadecyl-s-triazine (theory, 3.2% by weight), corresponding to a yield of 75%; molecular weight 415.

EXAMPLE 19

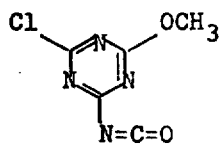

13.6 g (0.085 mol) of 2-amino-4-chloro-6-methoxy-s-triazine in 172 g (1.4 mols) of nitrobenzene are heated at 180°C. Excess phosgene is passed in over the course of 8 hours at this temperature. 183 g of a reaction mixture containing 7.3% by weight of 2-chloro-4-isocyanato-6-methoxy-s-triazine (theory, 8.4% by weight) are obtained, corresponding to a yield of 87%; molecular weight 186.

EXAMPLE 20

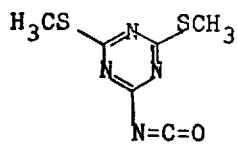

15 g (0.08 mol) of 2,4-dimethylthio-6-amino-s-triazine in 210 g (1.7 mols) of nitrobenzene are heated at 180°C. Excess phosgene is passed in over the course of 8 hours at this temperature. The resulting reaction mixture contains 6.2% by weight of 2,4-dimethylthio-6-isocyanato-s-triazine (theory, 7.5% by weight), corresponding to a yield of 82%; molecular weight 214.

EXAMPLE 21

20.6 g (0.125 mol) of 2,4-dichloro-6-amino-s-triazine are dissolved in 240 g (2.0 mols) of sulpholane at 180°C. Phosgene is passed in for 8.5 hours at this temperature. The reaction mixture contains 7.0% by weight of 2,4-dichloro-6-isocyanato-s-triazine (theory, 8.7% by weight), corresponding to a yield of 80%; molecular weight 191.

EXAMPLE 22

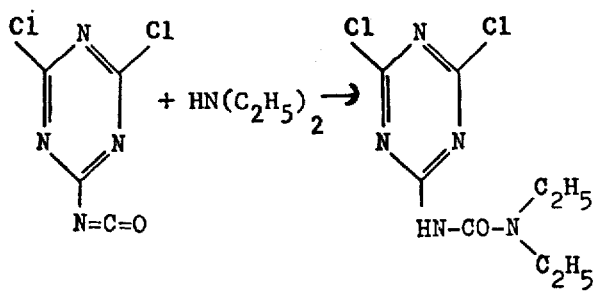

120.5 g (0.04 mol) of a 6.5% strength solution of 2,4-dichloro-6-isocyanato-s-triazine in nitrobenzene, prepared according to the process described in Example 1, are diluted with 30 ml of absolute diethyl ether in a 350 ml sulphonation flask equipped with a gas inlet and outlet tube, a dropping funnel and a cooling bath, and are cooled to between −10° and −15°C under nitrogen. A solution of 2.98 g (0.04 mol) of N,N-diethylamine in 30 ml of absolute diethyl ether is then added dropwise over the course of 1 hour at the same temperature. The urea derivative of the above formula separates out in the form of a white precipitate. After 1 hour, the mixture is filtered and the residue is washed with diethyl ether and dried. 7 g of crude product (66.3% of theory) are obtained. After recrystallisation of this crude product from 160 ml of chlorobenzene, 5.5 g of pure N,N-diethyl-N'-(2,4-dichloro-s-triazinyl-6)-urea of melting point 175°–177°C are obtained. The product is identical with corresponding urea derivative which is obtained by synthesis from pure 2,4-dichloro-6-isocyanato-s-triazine and N,N-diethylamine.

What we claim is:

1. A process for the manufacture of s-triazinyl-monoisocyanates or s-triazinyl-diisocyanates of the formula I

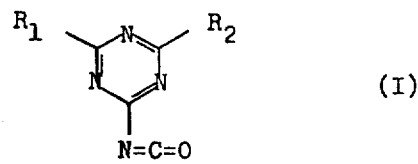

wherein $R_1$ represents the isocyanate group, a halogen atom, an alkoxy radical or alkylthio radical with 1–6 carbon atoms or a N,N-dialkylamino radical with 1–4 carbon atoms in each of the alkyl radicals and $R_2$ represents a halogen atom, a phenyl radical, an alkyl radical with 1–18 carbon atoms, an alkoxy or alkylthio radical with 1–6 carbon atoms or a N,N-dialkylamino radical with 1–4 carbon atoms in each of the alkyl radicals, characterised in that s-triazinyl-monoamines or s-triazinyl-diamines of the formula II

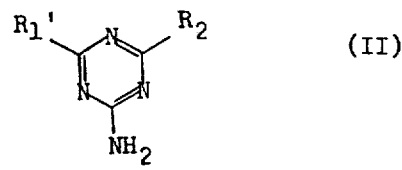

wherein $R_1'$ represents a —$NH_2$ group, a halogen atom, an alkoxy or alkylthio radical with 1–6 carbon atoms or a N,N-dialkylamino radical with 1–4 carbon atoms in each of the alkyl radicals and $R_2$ has the meaning indicated under the formula I, is reacted with phosgene in a 3-alkoxypropionitrile with 1–4 C atoms in the alkoxy radical, in nitrobenzene, in sulpholane or in o-dichlorobenzene and, if appropriate, in the presence of a catalyst, at a temperature not below 150°C.

2. A process according to claim 1, characterised in that 2-chloro-4,6-diamino-s-triazine is used.

3. A process according to claim 1, characterised in that 2,4-dichloro-6-amino-s-triazine is used.

4. A process according to claim 1, characterised in that the reaction is carried out in nitrobenzene, 3-methoxypropionitrile, 3-ethoxypropionitrile or sulpholane.

5. A process according to claim 1, characterised in that the reaction is carried out at a temperature between 160° and 200°C.

6. A process according to claim 1, characterised in that the reaction is carried out in the presence of 1 to 20 percent by weight of a catalyst, based on the s-triazinyl-monoamine or s-triazinyl-diamine of the formula II which is employed.

7. A process according to claim 1, characterised in that N,N-dimethylformamide is used as the catalyst.

* * * * *